United States Patent [19]

Hausch

[11] Patent Number: 4,544,427
[45] Date of Patent: Oct. 1, 1985

[54] APPLICATION OF AMBIENT TEMPERATURE CURED POLYMERS OR PREPOLYMERS TO A CURED ELASTOMER

[75] Inventor: Walter R. Hausch, Akron, Ohio

[73] Assignee: The Firestone Tire & Rubber Company, Akron, Ohio

[21] Appl. No.: 584,659

[22] Filed: Jan. 23, 1984

Related U.S. Application Data

[60] Division of Ser. No. 477,451, Mar. 21, 1983, Pat. No. 4,435,456, which is a continuation-in-part of Ser. No. 316,023, Oct. 28, 1981, Pat. No. 4,399,852, which is a division of Ser. No. 164,127, Jun. 30, 1980, Pat. No. 4,327,138, which is a continuation-in-part of Ser. No. 73,760, Sep. 10, 1979, abandoned.

[51] Int. Cl.⁴ .................. B29H 5/16; B60C 21/02; B32B 25/04; F16L 11/12
[52] U.S. Cl. ..................... 156/97; 152/450; 156/95; 156/326; 156/307.3; 138/104; 428/36; 428/413; 428/423.9; 428/492
[58] Field of Search ............ 156/116, 326, 95, 97, 156/307.3; 152/353 R, 374, DIG. 12, 330 R; 138/104; 116/278; 428/36, 411, 413, 423.3, 423.9, 424.6, 424.7, 424.8, 492, 521, 523, 79, 187, 447, 474.4

[56] References Cited

U.S. PATENT DOCUMENTS

| | | | |
|---|---|---|---|
| 3,644,256 | 2/1972 | Broisman | 269/29 |
| 3,718,587 | 2/1973 | Bhakuni | 252/8.6 |
| 3,755,261 | 8/1973 | VanGulick | 260/77.5 |
| 3,779,794 | 12/1973 | DeSantis | 117/72 |
| 3,834,934 | 9/1974 | Broisman | 117/76 T |
| 3,888,831 | 6/1975 | Kogon | 260/77.5 |
| 3,966,530 | 6/1976 | Cutts et al. | 156/308 |
| 3,991,255 | 11/1976 | Blaskiewicz et al. | 428/425 |
| 4,085,283 | 4/1978 | Den Otter et al. | 260/248 |
| 4,125,522 | 11/1978 | Becker | 528/61 |
| 4,136,219 | 1/1979 | Odam et al. | 427/385 B |
| 4,143,454 | 3/1979 | Utsunomiya et al. | 29/460 |
| 4,158,378 | 6/1979 | Pearson et al. | 152/353 R |
| 4,240,852 | 12/1980 | Gomberg et al. | 156/96 |
| 4,300,970 | 11/1981 | Honda et al. | 156/244.11 |
| 4,352,704 | 10/1982 | Williams | 156/125 |
| 4,434,832 | 3/1984 | Koch | 428/63 |
| 4,465,535 | 8/1984 | Fieldhouse | 428/423.9 |
| 4,485,135 | 11/1984 | Koch | 428/36 |
| 4,485,136 | 11/1984 | Koch | 428/36 |

Primary Examiner—Ellis P. Robinson
Attorney, Agent, or Firm—Daniel N. Hall

[57] ABSTRACT

A process and composition for applying and bonding an amine curable polymer or prepolymer at ambient temperatures to the surface of a cured elastomer substrate. The elastomer article or substrate is treated with an organic oxidant such as an N-halohydantoin, N-haloamide, or an N-haloimide, for example, the various isomers of mono-, di-, and trichloroisocyanuric acid. A polyisocyanate is applied thereto. A composition of the amine curable polymer or prepolymer is prepared with an amine curing agent. To the curing agent and curable polymer or prepolymer composition is added a polar solvent which is mixed with the resulting blend or mixture and added to the treated elastomer surface; said polymer or prepolymer cures at ambient temperature and becomes bonded to said elastomer. The application is relatively easy, since the entire mixture is a liquid and can be applied in situ. The invention is particularly suitable for repairing various damaged elastomer articles such as tires (especially off-the-road), conveyor belts, hoses, preparation of caulking or sealing compounds, and especially in bonding tire lugs or tire treads to a tire carcass.

10 Claims, 3 Drawing Figures

APPLICATION OF AMBIENT TEMPERATURE CURED POLYMERS OR PREPOLYMERS TO A CURED ELASTOMER

CROSS-REFERENCE

This application is a division of U.S. application Ser. No. 477,451, filed Mar. 21, 1983, now U.S. Pat. No. 4,435,456, which in turn is a continuation-in-part of my prior application bearing U.S. Ser. No. 316,023, filed Oct. 28, 1981, now U.S. Pat. No. 4,399,852, which in turn is a division of U.S. Ser. No. 164,127, filed June 30, 1980, now U.S. Pat. No. 4,327,138 granted Apr. 27, 1982, which in turn is a continuation-in-part of U.S. Ser. No. 73,760, filed Sept. 10, 1979, now abandoned.

TECHNICAL FIELD

The present invention relates to a composition and method of applying an amine curable polymer or prepolymer, to the surface of a cured elastomer substrate that has been chemically treated. More specifically, the present invention relates to bonding a urethane polymer at ambient temperatures to a cured rubber substrate with a chemically treated surface.

BACKGROUND ART

Heretofore, elastomer tire treads have been bonded to a rubber carcass by conventional procedures. Moreover, elastomer or rubber tires, such as automotive passenger tires and especially off-the-road tires such as those used in construction and mining operations, have been subject to damage such as cuts, gouges, lug loss, and the like. Naturally, such injuries weaken the tire; these tires have been treated with various items such as plugs, boots, and the like. However, the repair is usually not as strong as the original tire and often times failure of the tire occurs again at a later point in time.

Considering the prior art, U.S. Pat. No. 3,755,261 to VanGulick relates to complexes of 4,4'-methylene dianiline and/or racemic 2,3-di-(4,aminophenyl)butane with salts which have replaced MOCA in the curing of various amine curable prepolymers or polymers as, for example, urethane polymers or prepolymers. Cure is effected by heating the polymer or prepolymer to a temperature of about 90° C. to about 182° C.

U.S. Pat. No. 3,888,831 to Kogon relates to various polar compounds containing no reactive hydrogens which may be utilized in effecting ambient or room temperature cures of various amine curable polymers in the presence of complexes of MDA or racemic 2,3-di-(4-aminophenyl) butane and salts thereof.

U.S. Pat. No. 3,834,934 to Broisman relates to an adhesive composition in bonding rubber to reinforcing fiber which primarily consists of a conventional R-F-L adhesive, that is a resorcinolformaldehyde-latex containing a small amount of a triallyl cyanurate composition having from 0.05 to 3 percent ring-bond chlorine. However, as readily apparent from the bottom of Column 2 and top of Column 3, the cyanurate compound utilized by Broisman is different from applicant's in that the chlorine is directly bound to the carbon atom, whereas in applicant's trichloroisocyanuric acid, the chlorine is bound to the nitrogen atoms. As set forth in Volume 20, page 666 of the 2nd Edition of Kirk-Othmer Encyclopedia of Chemical Technology, cyanuric chloride reacts like an acid chloride that is quite different from N-chlorinated derivatives which are active chlorine-containing compounds. Hence, Broisman relates to an entirely different cyanurate compound which constitutes but a very small portion of the R-F-L adhesive composition.

U.S. Pat. No. 3,644,256 also to Broisman is very similar to 3,834,934 and hence is not pertinent for the reasons set forth immediately above.

U.S. Pat. No. 3,718,587 to Bhakuni et al relates to cyanuric acid derivatives as adhesive promoting agents applied to tire yarn as a means of promoting adhesion between the cord and the rubber when used in conventional R-F-L adhesives. Hence, this patent fails to teach any suggestion of a chlorinated acid derivative and its utilization in treating an elastomer substrate.

U.S. Pat. No. 3,779,794 to DeSantis relates to a moisture-curable polyurethane sealant primer system which utilizes various blocking agents which are relatively volatile at room temperature.

U.S. Pat. No. 4,085,283 to Denn Otter et al relates to flame retardants utilizing cyanuric acid derivatives.

U.S. Pat. No. 4,143,454 to Utsunomiya et al relates to a method of fixing connected parts of a rubber offshore structure. The application of a liquid rubber to a rubber is disclosed. An aqueous treating solution is utilized to treat the elastomer surface.

U.S. Pat. No. 4,158,378 to Pearson relates to the application of a polyurethane tread to a rubber tire carcass utilizing basically polycaprolactone polyols. Applicant's treating compounds are not disclosed.

An article entitled "Room Temperature Vulcanizing Adhesive Based on Ethylene-Propylene-Diene Terpolymer," Cantor, Uniroyal, Paper No. 18 presented to the Division of Rubber Chemistry of the American Chemical Society, Denver, Colo., Oct. 10, 1973, relates to various oxidants such as those utilized by applicant, which effect ambient temperature cures of EPDM. However, none of these compounds have heretofore been utilized to effect a bond between an amine curable polymer or prepolymer and an elastomer substrate.

Hughson Chemical Division, Lord Corporation, Product No. TS-2682-71, a surface primer for elastomeric substances is a proprietary compound, thought to be mono-, and/or dichloroisocyanuric acid. However, the primer is used only to enhance bonding of rubber to rubber or rubber to metal surfaces.

U.S. Pat. No. 4,136,219 to Odam relates to two methods or processes for applying polyurethane paint to vulcanized rubber parts. In one method, the rubber is sensitized by a benzophenone spray. In the other process, a resin cure is utilized for the rubber which is activated by the addition of halogenated rubbers. Totally lacking from this patent is any suggestion of an adhesive treating material as utilized by applicant.

U.S. Pat. No. 3,991,255 to Blaskjiewicz et al describes the adhesion of a polyurethane to an EPDM surface utilizing various chemical adhesives such as N,N-dihalosulfonamide or a cyclic N-haloamide including trichloroisocyanuric acid. However, an elevated temperature is needed to cure the EPDM as well as to bring about the reaction between said EPDM and the adhesive compound. Thus, it does not relate to any ambient temperature cure as in the present application.

British Pat. No. 1,352,645 relates to N-halogen sulphonamide treating agents which halogenize surfaces of synthetic and/or natural rubbers with a halogen donor in order to render these surfaces more effectively glueable to rubber or other materials.

U.S. Pat. No. 4,125,522 to Becker merely relates to a polyurethane adhesive in which a mixture of a methylenedianiline/sodium chloride complex is utilized at a temperature of 70° C.

U.S. Pat. No. 3,966,530 to Cutts et al relates to various triazoline diones which are utilized in lieu of chlorinated or halogenated donors for treating elastomeric surfaces to improve adhesion.

U.S. Pat. No. 4,240,852 to Gomberg et al relates to bonding urethanes to a rubber article through the utilization of a cyanoacrylate adhesive. This patent thus lacks any suggestion of or application of treating agents to the rubber substrate.

U.S. Pat. No. 4,300,970 to Honda et al relates to bonding various plastics to a rubber compound. This patent does not contain any suggestion of the utilization of an amine curable polymer or prepolymer (for example a urethane) and, inasmuch as the plastic is injection molded or otherwise applied hot, does not relate to an ambient temperature cure. Honda is furthermore not a valid reference in that its filing date is after the filing date of the original Hausch application, U.S. Ser. No. 73,760 through which applicant claims through a continuous chain of applications.

The above patents all further fail to suggest or teach the utilization of the polyisocyanate which is applied to the treating agent and to which in turn is applied the amine curable polymer or prepolymer.

DISCLOSURE OF INVENTION

It is therefore an aspect of the present invention to provide good adhesion or bond between an amine curable polymer or prepolymer and a rubber substrate.

It is yet another aspect of the present invention to provide a good bond or adhesion to a rubber substrate, as above, wherein a treating agent resides on said rubber substrate and is an N-haloamide, N-halohydantoin, or an N-haloimide.

It is another aspect of the present invention to provide a good bond or adhesion to a rubber substrate, as above, wherein a polyisocyanate resides upon said treating agent layer.

It is yet another aspect of the present invention to provide a good bond or adhesion to a rubber substrate, as above, wherein said amine curable polymer or prepolymer is a polyurethane.

It is yet another aspect of the present invention to provide a good bond or adhesion to a rubber substrate, as above, wherein said rubber substrate is in the form of a tire, a conveyor belt, radiator hose, and the like.

It is yet another aspect of the present invention to provide a good bond or adhesion to a rubber substrate, as above, wherein said amine curable polymer or prepolymer to rubber bond has good high temperature adhesion.

These and other aspects of the present invention will become more apparent from the description of the invention set forth herein.

In general, the invention, in one embodiment, is a rubber substrate having an amine curable polymer or prepolymer adhered thereto, comprising:

(a) a cured rubber substrate having unsaturated groups therein;

(b) a treating agent bonded to said substrate, said treating agent selected from the group consisting of N-halohydantoins, N-haloamides, and N-haloimides, and combinations thereof;

(c) a polyisocyanate layer, said polyisocyanate layer residing on said treating agent, said polyisocyanate being a compound having the formula $R(N=C=X)_n$ where R is an alkyl having from 2 to 20 carbon atoms, a cycloalkyl having from 4 to 20 carbon atoms, an aromatic or an alkyl substituted aromatic having from 6 to 20 carbon atoms, where n is 2 or 3, and where X is oxygen or sulfur;

the amine curable polymer or prepolymer bonded to said polyisocyanate layer at ambient temperature.

In general, another embodiment is a process for applying an amine curable polymer or prepolymer to a cured rubber substrate having unsaturated groups therein, comprising the steps of:

applying a treating agent to said rubber substrate, said treating agent selected from the group consisting of N-halohydantoins, N-haloamides, and N-haloimides, applying a polyisocyanate to said treating agent, said polyisocyanate having the formula $R(N=C=X)_n$ where R is an alkyl having from 2 to 20 carbon atoms, a cycloalkyl having from 4 to 20 carbon atoms, an aromatic or an alkyl substituted aromatic having from 6 to 20 carbon atoms, where n is 2 or 3, and where X is oxygen or sulfur, applying an ambient temperature amine curable polymer or prepolymer to said rubber substrate, and curing said amine curable polymer or prepolymer at an ambient temperature.

BEST MODE FOR CARRYING OUT THE INVENTION

Figure 1:
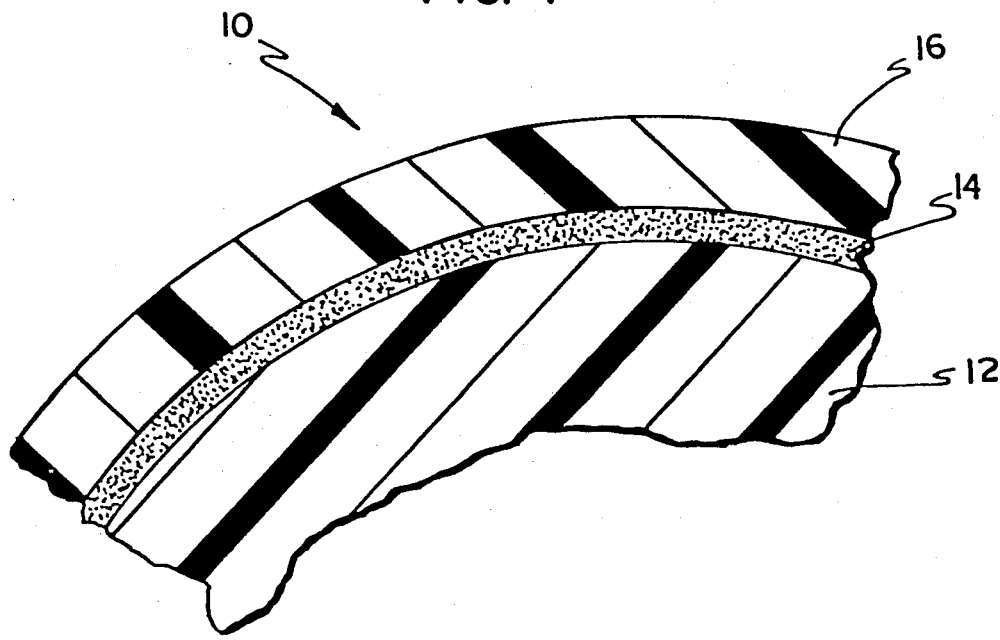
FIG. 1 is a partial side cross-sectional view of a laminate of the present invention.

The elastomer base or substrate is one that has been cured in a conventional manner and can be made from rubber compounds known to those skilled in the art. Such rubber compounds or polymers contain groups of unsaturation therein. One such class is the conjugated dienes having from 4 to 12 carbon atoms. Specific examples of diene monomers include butadiene, isoprene, pentadiene, hexadiene, heptadiene, octadiene, 2,3- dimethyl-1,3-butadiene, 2-methyl-1,3-pentadiene, and the like. Preferred conjugated elastomers are made from monomers of butadiene and/or isoprene. Moreover, natural rubber can be utilized. By the term "natural rubber," it is meant the elastomeric substance obtained from various trees and plants which generally grow in the tropics or desert portions of the world. Such material contains a very high content (in excess of 90 percent and often in excess of 95 percent) of cis-1,4-polyisoprene. Also included within the class of conjugated dienes and/or natural rubber are the various copolymers and interpolymers thereof (e.g., polybutadiene-isoprene), including the various diblock copolymers, triblock copolymers (e.g., polystyrenebutadiene-styrene), and the like.

Another group of useful elastomers includes the various copolymers made from monomers of conjugated dienes having from 4 to 12 carbon atoms as set forth above and vinyl substituted aromatic compounds containing from 8 to 15 carbon atoms. Examples of specific vinyl substituted aromatic compounds include styrene, alpha-methylstyrene, 4-t-butylstyrene, vinyl toluene, divinyl benzene, isopropenyl benzene, diisopropenyl benzene, and the like. Examples of specific copolymers thus include polystyrene-butadiene (SBR), poly-alpha-methyl-styrene-butadiene, and poly-4-t-butylstyrene-butadiene. A preferred copolymer is a polystyrene-butadiene.

Another group of rubber compounds that are useful are the so-called butyl rubbers which are actually copolymers of isobutylene and a small amount of isoprene.

Neoprene, that is polychloroprene (2-chloro-1,3-butadiene), can also be utilized. Still another class of useful elastomer rubbers are the nitrile rubbers, that is copolymers made from dienes as set forth above having from 4 to 12 carbon atoms with acrylonitrile monomers. Usually, the ratio of the two monomers in nitrile rubber is similar to the ratio of butadiene to styrene in styrene-butadiene rubber. Blends of the above said rubbers can also be used.

The preparation of the various elastomers heretofore described is well known to those skilled in the art and are generally readily available in commerce, for example, tires, hoses, belts, etc. Regardless of the type or nature of article in which th elastomer may exist, it is desirable to clean the surface as by buffing and/or treatment with a conventional organic solvent prior to treating with the surface treating compound or composition. Another method of surface preparation involves skiving the surface; that is, cutting and removing a portion of the surface as for example in the situation where the surface contains an opening.

According to the concepts of the present invention, it has been found that a very strong bond between, for example, an amine curable polymer or prepolymer and a cured elastomer substrate is formed when the substrate, which has previously been cured, is treated with, for example, a halogen-containing oxidant. Specifically, treatment of the elastomer or rubber substrate can be effected with the various N-halosulfonamides, the various N-halohydantoins, the various N-haloamides, and the various N-haloimides. Examples of various desirable N-halosulfonamides include N,N,N',N'-tetrachloro-oxybis(benzenesulfonamide); N,N,N',N'-tetrachloro-4,4-biphenyl disulfonamide, N,N,N',N'-tetrachloro-1,3-benzene disulfonamide; and N,N,N',N'-tetrabromo-oxybis(benzenesulfonamide). Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various mono-, di-, and trichloroisocyanuric acids. A preferred treating composition for use in the practice of the present invention are the various chloro substituted triazinetriones, commonly known as mono-, di-, or trichloroisocyanuric acids, or combinations thereof. Trichloroisocyanuric acid (trichloro-S-triazinetrione) is especially preferred.

Although some of these oxidant treating compounds are usually solid, they are soluble or dispersible in solvents, such as those noted below, and thus exist in a liquid form that can be utilized. Moreover, the treating compound is one that is applied to the cured and cleaned elastomer at ambient temperatures.

The adhesive or oxidant treatment system selected can be applied to the cured rubber substrate in any conventional manner as through brushing, spraying, and the like of a liquid oxidant or a solution of said oxidant in an organic inert solvent, and is applied in a sufficient amount to coat the substrate surface. Preferably, two or more coats of the adhesive compound are used to ensure that all of the cured rubber substrate surface has been coated. By way of convenience, the halogen-containing oxidant treating system can be applied with a suitable solvent such as ethyl acetate or acetone in an amount of from 0.1 to 10 percent by weight based upon the total weight and preferably from about 0.5 percent to about 5 percent; this system dries within a matter of minutes so that the curable polymer or prepolymer compound can then be bonded thereto. The adhesive treating system adds halogen groups, for example, chlorine, to the cured rubber which activates the cured rubber surface allowing the polymer system to form a strong bond.

Of the various curable polymer or prepolymer systems which can be utilized, the amine curable polymers or prepolymers are desired. Of this group, the urethanes are preferred. Other prepolymers or polymers which can be cured with the amine curing agent include the compounds set forth in U.S. Pat. No. 3,755,261 which is hereby fully incorporated by reference. Briefly, such compounds are the various epoxy resins such as those disclosed in the "Encyclopedia of Polymer Science and Technology" Interscience Publishers, New York (1967), Volume 6, pages 212–221; halogen-containing hydrocarbon polymers such as chloroprene polymers, chlorinated butyl rubber, and chlorinated polyethylene and polypropylene; chlorosulfonated polymers such as those described in U.S. Pat. No. 2,723,257; polymers containing acid halide groups such as

and haloformate groups such as

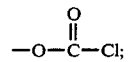

polymers containing anhydride groups which on reaction with diamines yield amide-acid linkages, and organo-polysiloxanes as described in U.S. Pat. No. 2,938,010.

The urethane prepolymers or polymers, that is those which contain isocyanate groups, are generally formed by first reacting a polyether polyol or a polyester polyol with a molar excess of an organodiisocyanate to form a prepolymer having terminal isocyanate groups. The polymer is then cured to increase its molecular weight from less than about 3,000 upwards to over 10,000. Examples of such polymers are set forth in U.S. Pat. Nos. 2,620,516; 2,777,831; 2,843,568; 2,866,774; 2,900,368; 2,929,800; 2,948,691; 2,948,707; and 3,114,735, all of which are hereby fully incorporated by reference. Typical specific examples of such polyurethanes include Adiprene L-367, polytetramethylene ether glycol containing approximately 6.4 percent isocyanate end groups by weight, manufactured by DuPont; Adiprene L-42, polytetramethylene ether glycol containing approximately 2.8 percent isocyanate end groups by weight, manufactured by DuPont; and Cyanaprene A-7, a polyester-based coating polymer with approximately 2.4 percent isocyanate end groups, manufactured by American Cyanamid. Blends of these polyurethanes can also be utilized.

To the curable prepolymer or polymer compound is added a conventional curing agent, known to those skilled in the art. For the amine curable prepolymers or polymers, naturally an amine curing agent is utilized. Generally, any conventional or known amine curing agent can be used and, thus, only a few specific examples will be given. Thus, the curing agent can be MOCA, that is 4,4'-methylene bis(2-chloroaniline) or, desirably a complex of 4,4'-methylene dianiline and a salt, or a complex of racemic 2,3-di-(4-aminophenyl) butane and a salt, as set forth in U.S. Pat. No. 3,755,261 to VanGulick which is hereby fully incorporated by reference. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes or salts derived from 4,4'-methylene dianiline are highly preferred. Another class of amine curing agents which can be utilized are the various Versamides, that is the condensation products of polyamides and dibasic acids obtained when certain unsaturated fatty acids are polymerized, and are manufactured by Henkel Chemical Company.

The equivalent weight of the curing agent utilized with regard to the curable prepolymer or polymer, including the amine curing agent, generally ranges from about 85 percent to 115 percent with from about 95 to 105 percent being preferred.

Often to facilitate processing, the curing agent, and especially an amine curing agent such as the complex of 4,4'-methylene dianiline and a salt is utilized with a plasticizer such as dioctylphthalate on a 50 percent weight basis, or Flexol 4-GO, tetraethylene glycol bis(2-ethyl hexanoate) manufactured by Union Carbide Corporation on a 50 percent weight basis.

The curing agent is blended with the prepolymer or polymers in various mixers such as dough mixers, high speed impellers, paddle-type mixers, and the like. Small batches can be mixed by stirring with a spatula. Usually, the prepolymer or polymer is a liquid. If not, when mixed with the polar solvent, a liquid mixture results. Depending upon the type of amine curing agent, it can be a liquid or a solid. However, even if a solid curing agent is used, when added to the prepolymer or the polymer, and to a solvent system, a liquid system results even though the curing agent (e.g., amine) can be in the form of a dispersion. Thus, even though the system may contain solids therein, the solids exist in the form of a dispersion so that a liquid system is produced.

The curing agent and the curable polymers or prepolymers (e.g., the amine) form the curable polymer system which is mixed with a polar solvent so that a liquid system is obtained which cures at ambient or room temperature, that is, the prevailing temperature as from about 10° C. to about 50° C. Often the ambient temperature will range from about 15° C. to about 35° C. or 40° C. The polar solvents which can be utilized, especially with the amine curing agent and the amine polymers or prepolymers are, for example, set forth in U.S. Pat. No. 3,888,831 to Kogon which is hereby fully incorporated by reference. Generally, the amount of solvent utilized per 100 parts by weight of the curable prepolymer or polymer ranges from about 2 to about 40, desirably from about 2 to about 20, and preferably from about 5 to about 15. Specific examples of preferred solvents include dimethylformamide, tetrahydrofuran, cyclohexanone, ethyl acetate, nitromethane, nitroethane, nitropropane, methyl ethyl ketone, and acetone. Acetone and methyl ethyl ketone are highly preferred. The amount of curing agent, based upon said polymer or prepolymer, ranges from about 0.85 to about 1.15 equivalents.

In the bonding of tire treads or lugs to tires, generally, the polar solvent, the curable prepolymer or polymer and the curing agent are mixed together in a conventional manner and then applied to the previously treated elastomer base and substrate. In the patching of tire cuts, gouges, and the like, hereinafter generally referred to as an opening resulting from damage, the curing agent is generally added last, with the mixture then being applied to the tire or substrate. Naturally, depending upon the end product, either the solvent or the curing agent can be added last, mixed, and the mixture applied to the elastomer substrate. Cure of the curable prepolymer or polymer, and especially the amine curable prepolymer or polymer, commences upon contact with the solvent so that the mixing step should not be of a length of time such that any significant cure occurs. Depending upon the final item produced, the solvent-system composition applied to the elastomer can be molded, cast, coated, or otherwise formed to make a suitable end product. During cure, an effective and a strong bond is formed between the prepolymer or polymer system and the treated elastomer substrate. Depending upon the article to be made, the treating agent and the prepolymer or polymer mixture can be applied to the entire article or to a portion, length, area, etc., thereof.

The laminate and process of the present invention permits "on the spot" or in situ preparation of the items which are then applied to a damaged tire, or other cured and damaged elastomer substrate, without removal thereof from the vehicle, etc. Since the composition before cure is liquid, that is both the treating agent as well as the polymer or prepolymer treating system, it can be readily mixed, applied in a desired manner and-/or amount, and cured at ambient temperatures.

A laminate 10 according to the present invention is shown in FIG. 1. The elastomeric base 12 can be any conventional item such as a tire carcass, rubber hose substrate, a radiator hose, conveyor belt substrate, a rubber boot, or the like. As described above, it is treated with a solution or an oxidant 14 of the present invention such as trichloroisocyanuric acid (trichloro-s-triazinetrione). To the treated substrate is applied the mixture of an amine curing agent (e.g., an amine curing compound), a curable polymer or prepolymer, (for example, an amine curable polymer or prepolymer), and a polar solvent so that upon ambient temperature cure, an outer layer 16 is formed. As previously noted, outer layer 16 can be a tire tread, a coating upon a conveyor belt, or the like. According to one of the preferred embodiments of the invention, it is a urethane tire tread upon a rubber carcass. Moreover, it can be a urethane plug filling, a tire opening, a hose opening, etc., that is a cut or gouge.

Figure 2:
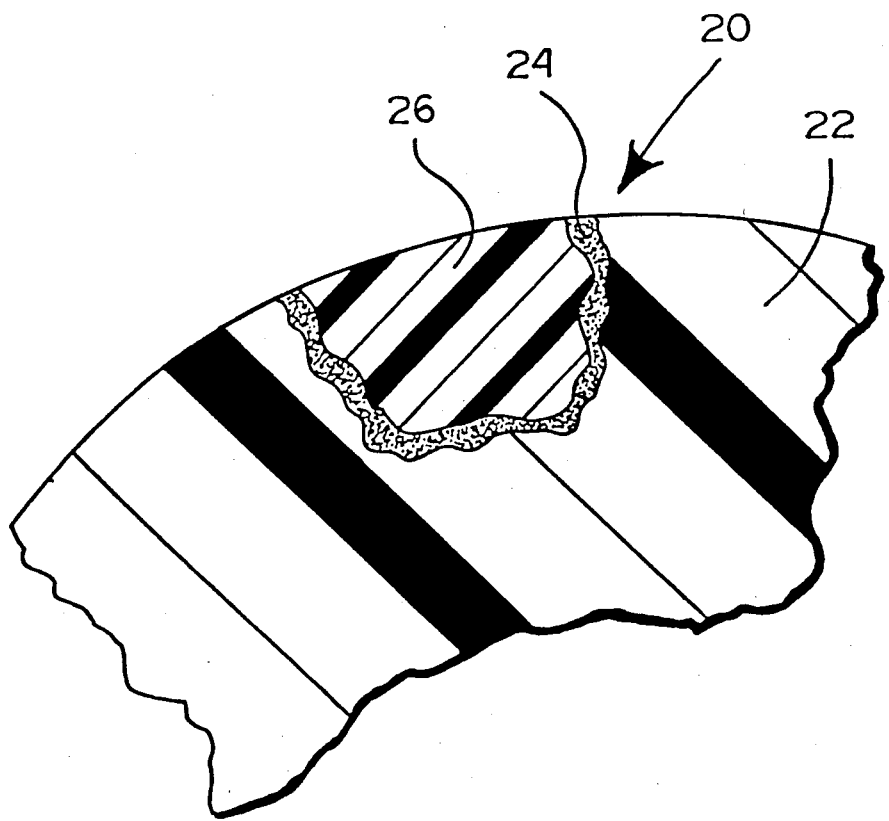
FIG. 2 is a partial side cross-sectional view of a tire repaired according to the present invention.

A repaired tire is shown in FIG. 2, generally indicated by the numeral 20. The substrate 22, a cured tire, has an opening therein. The opening is first cleaned in a routine manner as previously noted, for example, with a solvent. To the cleaned opening is then applied at least one layer of a treating agent 24 forming a bonded coating to the surface of the opening. To this is added the liquid treating system which is a mixture of a curing agent, a curable polymer or prepolymer, and a polar solvent as set forth above. A sufficient amount of the curing system 26 is added to generally fill the opening so that the surface of the substrate generally conforms to its original level. Heat need not be applied since cure is achieved at ambient temperatures. It is advisable to tape or cover the repaired area in order to reduce the loss of polar solvent before the repair is completely cured. Thus, an in situ repair can be made without the need to remove the tire or the substrate.

Due to the fact that the adhesive treating system of the present invention forms an unexpected strong bond, the invention has numerous practical applications. Some of the applications include repair of tires, such as automotive passenger tires, and especially off-the-road tires, wherein preferably a urethane polymer is used to plug or fill scratches, gouges, or otherwise torn portions or openings of tires. Similarly, conveyor belts, hoses, rubber boots, and other items can be repaired. Still another use is the bonding of tread lugs to tire carcasses and the bonding of tire treads (that is retreading) to a tire carcass. Of course, numerous other uses exist wherever a strong durable material is desired to be added to the cleaned and treated surface of a cured elastomer substrate wherein a strong and unexpected bond is desired to be formed between the prepolymer or polymer, for example, urethane, and the treated rubber substrate.

Various additives in small amounts can be added to the amine curing agent and prepolymer system such as colorants, softeners, fillers, antioxidants, and the like.

The invention will be better understood by reference to the following representative examples.

EXAMPLE 1

A repair patch was made to a larger size tire, 36.00×51, utilizing a urethane prepolymer as follows:

The prepolymer curing agent system contained the following:
300 grams of Adiprene L-42, manufactured by DuPont;
20.25 grams of dioctylphthalate;
30 grams of acetone; and
15 grams of carbon black [Regal 400 R ink dispersed in DOP (dioctylphthalate)]

The tire which contained a gouge approximately 9 inches long by ⅜ inch wide and 4 inches deep was cleaned by washing with acetone to remove the oil, wax, dirt, and the like. The surface was then treated with trichloro-s-triazinetrione (TCTT) contained in ethyl acetate on approximately a 3 percent weight basis of TCTT. Two coats were applied to the tire gouge to ensure that all portions of the surface were treated. The coating was allowed to dry (approximately 10 minutes). Then, the above formulation was mixed with 45 grams of Caytur 22 curing agent (manufactured by DuPont) containing 4,4'-methylene dianiline complex (MDA) with sodium chloride salt contained in a 50 percent by weight solution of Flexol 4-GO (tetraethylene glycol bis-2-ethyl hexoate). The components were mixed by stirring with a spatula and applied to the tire gouge such that the original tire surface shape was restored. The mix set to a gel in about 30 minutes. After approximately 24 hours, the tire was put back into service.

The repaired tire was still in use and performing well after four months, with the repaired portion still being fully intact.

EXAMPLE 2

An 18.4×38 Firestone brand all traction field and road tractor tire was suspended vertically in a large shallow box and a polyurethane plastic mix was poured around the bottom. After the mix had cured, the tire was removed leaving an imprint of the tire tread in plastic. This was used as a mold for casting polyurethane lugs on the tractor tire body.

Three of the lugs on the tractor tire were then cut off. The cut surface was swabbed with acetone to remove debris from cutting, oils, waxes, etc. The surface was given two coats of 3.0 percent trichloro-S-triazinetrione primer (a 3 percent solids solution of mixed mono-, di-, and trichloroiso-S-triazinetrione compounds in ethyl acetate) and allowed to dry.

The above prepared mold was coated with a release agent. The cavities were then filled with an ambient temperature curing polyurethane mix compound of:
3,000 grams of Adiprene L-367;
960 grams Caytur 21 (MDA with sodium chloride salt contained in approximately 50 percent weight solution of dioctylphthalate);
255 grams Flexol 4-GO;
250 grams methylethyl ketone; and
60 grams Regal 400R black master batch.

The vertically suspended tractor tire was lowered into the mold so that the lugs fitted into the mold previously made. The tire was allowed to stand in the mold for three days. In lifting the tire from the mold, the polyurethane lugs had replaced the three lugs which had been removed.

The tractor tire with the polyurethane lugs was taken to a test farm. Performance in a virgin field, on a dirt test track, and on a concrete test pad was excellent. The abrasion loss on the polyurethane lugs was only about half as great as the remainder of the rubber lugs. Adhesion of the polyurethane to the rubber was very good. Two of the lugs were fully intact and the third only loose on one edge.

From the foregoing, it can be readily seen that an extremely strong bond was formed which effectively secured the lugs to the tire.

The preceding examples can be varied within context of the total specification disclosure, as it would be understood by one skilled in the art. Moreover, it would be but of routine experimentation, by one skilled in the art, to arrive at a balanced and/or optimized system.

According to further concepts of the present invention, it has now been found that even better adhesion between the amine curable polymer or prepolymer and the elastomer substrate is obtained when a layer or coating of a polyisocyanate is applied to the treating layer before the application of said polymer or prepolymer thereto. Polyisocyanates which can be utilized generally have the formula $R(N\!=\!C\!=\!X)_n$ where n is 2 or 3, preferably 2, X is oxygen or sulfur, preferably oxygen, and R is an alkyl having from 2 to 20 carbon atoms, a cycloalkyl having from 4 to 20 carbon atoms, or an aromatic or an alkyl substituted aromatic having from 6 to 20 carbon atoms. Examples of polyisothiocyanates (i.e., where X is sulfur) include meta- or paraphenylene diisothiocyanate, diphenyl methane diisothiocyanate, dianisidine diisothiocyanates, toluene diisothiocyanates, hexamethylene diisothiocyanate, and the like. Specific examples of diisocyanates include meta- or paraphenylene diisocyanate, diphenyl methane diisocyanates, bitolyene diisocyanates, dianisidine diisocyanates, isophorone diisocyanates, toluene diisocyanates, hexamethylene diisocyanates, and pentamethylene diisocyanates. Since isocyanate solutions, even in the presence of solvents, tend to be somewhat viscous, low viscosity diisocyanates are preferred such that they can adequately coat the treating layer and even penetrate said treating layer and penetrate into the outer portions of the rubber substrate. Accordingly, toluene diisocyanate which generally has a low viscosity is preferred. Suitable solvents include any compound which is generally nonreactive to the various polyisocyanates such as di- and trichloroethane, hexane, the various acetate solvents, the various butylate solvents, the various propylate solvents, and the like.

The polyisocyanates are usually applied with a solvent in any conventional manner. For example, as by spraying, brushing, and the like. A sufficient number of coats is usually applied such that a thin layer or a film is formed on the treating agent. As noted above, the polyisocyanate will generally not only coat the treating layer but also penetrate therethrough and even into the rubber substrate surface. The thickness of the polyisocyanate layer is not important as long as generally the treating layer is coated. The polyisocyanate layer will generally dry in a matter of a few minutes.

Figure 3:
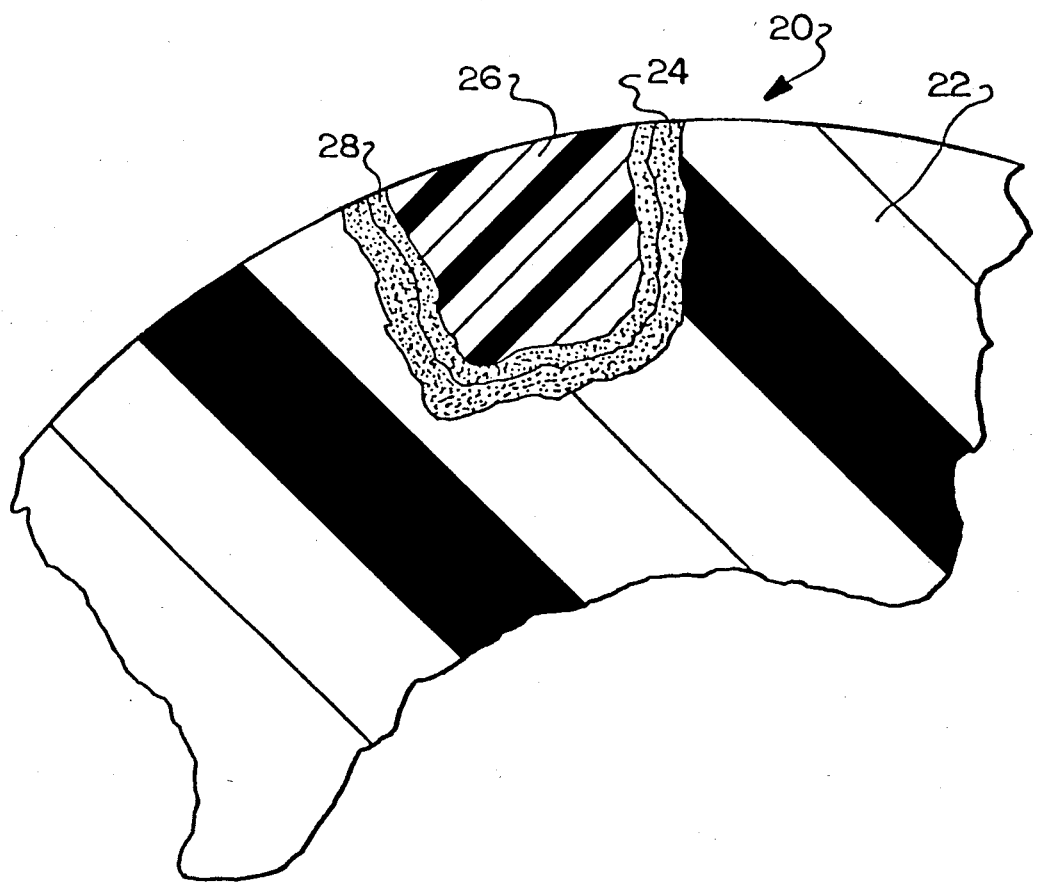
FIG. 3 is also a partial side cross-sectional view of a further aspect of the present invention showing a repaired tire.

The mixture of the amine curable polymer or prepolymer, the amine curing agent, and the polar solvent is then applied to the polyisocyanate layer in any desired amount. Reference to FIG. 3 reveals one application, that is a repaired tire generally indicated by the numeral 20. The substrate 22, that is a cured tire, has an opening therein. The opening is cleaned as set forth above, as with a solvent, and then a layer of treating agent 24 is applied. To this treating agent is then applied a polyisocyanate layer 28. The mixture of the amine curable polymer or prepolymer, and the like, is then added to the opening or gouge in an amount such that a flushed surface is created with the original tire tread, and the like. Due to the cure system, heat need not be applied since it can be achieved at ambient temperatures as noted above. However, the repaired area is desirably covered as by tape, etc., to reduce evaporation of the polar solvent and promote cure. Thus, an in situ repair can be made on a tire without need to remove the tire from the machine, or the like.

Through the use of a polyisocyanate layer, improved results are achieved such as peel adhesion, improved adhesion, and especially improved adhesion at high temperatures, that is, about 212° F. In addition to the repair of tires such as automotive passenger tires, off-the-road tires, and the like, the present invention can be utilized to repair gouges or openings in other rubber or elastomer substrates such as conveyor belts, hoses, and the like.

The invention will be better understood by reference to the following representative examples.

Adhesion pads A and B were used to test the present invention. Two 6"×6"×1/10' adhesion pad bases of precured off-the-road tread stock reinforced with nylon tire cord were used as the substrate surface. The surfaces were buffed with a wire brush and then cleaned with a cotton cloth soaked in acetone. After drying, both buffed surfaces were treated with three brush coats of 2 percent trichloro-S-triazinetrione in toluene. Pad A was given no further treatment. Pad B was treated with two coats of a 5 percent solution of toluene diisocyanate in toluene. Both pads were then allowed to stand at room temperature for approximately 15 minutes.

The pads were then coated over one half of the surface with Holland cloth to facilitate separation and then placed into a 6"×6"×¼" mold. A room temperature curing mixture of Adiprene L-42 containing Flexol 4GO manufactured by DuPont, Caytur 21, and acetone was poured over the pads. The amount of Adiprene L-42 was 300 grams, the amount of 4GO was 30 grams, the amount of Caytur 21 was 43 grams, and the amount of acetone was 30 grams. Caytur 21 curing agent is manufactured by DuPont and contains 4,4'-methylene dianiline complex (MDA) with sodium chloride salt and dioctylphthalate. A 6"×6" piece of square woven nylon mesh was placed in the mix to give reinforcement. The lid was placed on the mold and the pads were allowed to cure at ambient temperature overnight, that is approximately 21° C. After 3 days at room temperature, the pads were cut into 1-inch wide strips and tested for adhesion. Pad A, that is the control, had an adhesion of 47 pounds at room temperature and 1.5 pounds at 212° F. Pad B had an adhesion of 155 pounds at room temperature and 24 pounds at 212° F.

It can thus be seen that the adhesion utilizing a polyisocyanate was increased by at least the factor of three and the high temperature adhesion increase was even greater.

While the best mode and preferred embodiment has been described in detail, in accordance with the patent statutes, the invention is measured by the scope of the attached claims.

What is claimed is:

1. A process for applying an amine curable polymer or prepolymer to a cured rubber substrate having unsaturated groups therein, comprising the steps of:
    applying a treating agent to said rubber substrate, said treating agent selected from the group consisting of N-halohydantoins, N-haloamides, N-haloimides, and combinations thereof,
    applying a polyisocyanate to said treating agent, said polyisocyanate having the formula $R(N=C=X)_n$ where R is an alkyl having from 2 to 20 carbon atoms, a cycloalkyl having from 4 to 20 carbon atoms, an aromatic or an alkyl substituted aromatic having from 6 to 20 carbon atoms, where n is 2 or 3, and where X is oxygen or sulfur,
    applying an ambient temperature amine curable polymer or prepolymer system to said rubber substrate, and
    curing said amine curable polymer or prepolymer at an ambient temperature.

2. A process according to claim 1, wherein said rubber substrate is made from monomers selected from the group consisting of (a) conjugated dienes having from 4 to 12 carbon atoms, copolymers thereof, and interpolymers thereof, (b) natural rubber, (c) copolymers made from vinyl substituted aromatic compounds having from 8 to 15 carbon atoms and conjugated diene compounds having from 4 to 12 carbon atoms, (d) elastomers made from monomers of isobutylene and isoprene, (e) elastomers made from monomers of butadiene and acrylonitrile, (f) elastomers made from monomers of chloroprene, and (g) combinations thereof, and
    wherein said amine curable polymer or prepolymer system comprises an amine curable polymer or prepolymer, an amine curing agent, and a polar solvent, wherein said polar solvent is selected from (a) compounds having dipole moments in excess of 0.4 debye in which there are no more than a total of 8 $CH_3-$, $CH_2$, or tertiary carbon radicals per polar group contained in said compounds, and (b) benzene and biphenyl; and said amine curable polymer or prepolymer is selected from the group consisting of (a) epoxy resins; (b) halogen-containing hydrocarbon polymers; (c) chlorosulfonated polymers; (d) polymers containing acid halide groups such as

or haloformate groups such as

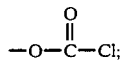

(e) polymers containing anhydride groups which, on reaction with diamines, yield amide-acid linkages; (f) organopolysiloxanes; (g) urethane polymers or prepolymers; and combinations thereof.

3. A process according to claim 2, including applying said amine curable polymer or prepolymer in liquid form.

4. A process according to claim 3, wherein said amine curable polymer or prepolymer is said urethane polymer or prepolymer, and wherein in said polyisocyanate formula, n is 2 and X is oxygen.

5. A process according to claim 4, wherein said treating agent is selected from the group consisting of 1,3-dichloro-5,5-dimethyl hydantoin; 1,3-dibromo-5,5-dimethyl hydantoin; 1,3-dichloro-5-methyl-5-isobutyl hydantoin; 1,3-dichloro-5-methyl-5-hexyl hydantoin; N-bromoacetamide; tetrachloroglycoluril; and N-bromosuccinimide; and wherein said polar solvent ranges from about 2 to about 40 parts per 100 parts of said prepolymer or polymer and is selected from the group consisting of esters, ketones, ethers, halogenated hydrocarbons, tertiary amines, nitrile paraffins, fully substituted amides, sulfones, sulfoxides, and sulfides.

6. A process according to claim 5, wherein said treating agent is selected from the group consisting of monochloroisocyanuric acid, dichloroisocyanuric acid, trichloroisocyanuric acid, and combinations thereof, and including covering said amine curable polymer or prepolymer during cure.

7. A process according to claim 6, wherein said polyisocyanate is toluene diisocyanate.

8. A process according to claim 7, wherein said rubber substrate is selected from the group consisting of polybutadiene, natural and synthetic cis-1,4-polyisoprene, and styrene-butadiene rubber,
wherein said polar solvent is selected from the group consisting of dimethylformamide, tetrahydrofuran, cyclohexanone, ethyl acetate, methyl ethyl ketone, and acetone,
wherein said amine curing agent is selected from the group consisting of (a) 4,4'-methylene bis(2-chloraniline), (b) a complex of 4,4'-methylene dianiline and a salt, said salt being selected from the group consisting of sodium chloride, sodium bromide, sodium iodide, sodium nitrite, lithium chloride, lithium bromide, lithium iodide, lithium nitrite, and sodium cyanide, (c) a complex of racemic 2,3-di-4(aminophenyl)butane with a salt, said salt selected from the group consisting of sodium chloride, sodium bromide, sodium iodide, potassium chloride, potassium bromide, potassium iodide, cesium chloride, cesium bromide, and cesium iodide, the ratio of said dianiline or said butane to said salt in said complex being 3 moles to 1 mole, the equivalent amount of said curing agent based upon said prepolymer or polymer ranging from about 0.85 to about 1.05 equivalents.

9. A process according to claim 7, wherein said rubber substrate is a tire having a gouge or opening therein and including repairing said tire.

10. A process according to claim 7, wherein said rubber substrate is a hose or belt having a gouge or opening therein and including repairing said belt or hose.

* * * * *